(12) United States Patent
Taylor et al.

(10) Patent No.: US 9,658,639 B2
(45) Date of Patent: May 23, 2017

(54) INCEPTOR APPARATUS

(71) Applicant: BAE SYSTEMS plc, London (GB)

(72) Inventors: Adam Taylor, Rochester-Kent (GB); Keith Michael DeSalvo, Rochester-Kent (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/653,594

(22) PCT Filed: Dec. 2, 2013

(86) PCT No.: PCT/GB2013/053183
§ 371 (c)(1),
(2) Date: Jun. 18, 2015

(87) PCT Pub. No.: WO2014/096773
PCT Pub. Date: Jun. 26, 2014

(65) Prior Publication Data
US 2016/0004270 A1    Jan. 7, 2016

(30) Foreign Application Priority Data

Dec. 20, 2012 (EP) .................................. 12275212
Dec. 20, 2012 (GB) ................................. 1222988.6

(51) Int. Cl.
*G01C 23/00* (2006.01)
*G05G 1/04* (2006.01)
(Continued)

(52) U.S. Cl.
CPC .............. *G05G 1/04* (2013.01); *B64C 13/04* (2013.01); *G05G 5/03* (2013.01); *G05G 9/047* (2013.01);
(Continued)

(58) Field of Classification Search
CPC G05G 1/04; G05G 5/03; G05G 9/047; G05G 25/00; G05G 2009/04718; G05G 2009/04766; B64C 13/04
See application file for complete search history.

(56) References Cited

U.S. PATENT DOCUMENTS 6,437,771 B1 * 8/2002 Rosenberg .............. A63F 13/06
345/156
6,512,509 B1    1/2003 McVicar
(Continued)

FOREIGN PATENT DOCUMENTS

EP        0659639 A1    6/1995
WO        9719440 A1    5/1997
(Continued)

OTHER PUBLICATIONS

International Preliminary Report on Patentability and Written Opinion received for Patent Application No. PCT/GB2013/053183, mailed on Jul. 2, 2015. 7 pages.
(Continued)

*Primary Examiner* — Hussein A. Elchanti
(74) *Attorney, Agent, or Firm* — Finch & Maloney PLLC

(57) ABSTRACT

An inceptor apparatus and method for operating a machine, the operation of the machine providing an output from at least one inertial sensor. The apparatus comprises a stick member having a base portion, and a grip portion extending from the base portion in only one direction. The apparatus further comprises at least one sensor for generating actual stick member position data, and a control unit configured to receive an inertial force signal from the or each inertial sensor and the actual stick member position data. The control unit is operable generate a first stick member position compensation signal in dependence upon the inertial force signal and actual stick member position data.

21 Claims, 1 Drawing Sheet

(51) Int. Cl.
  *B64C 13/04* (2006.01)
  *G05G 5/03* (2008.04)
  *G05G 9/047* (2006.01)
  *G05G 25/00* (2006.01)

(52) U.S. Cl.
  CPC ... *G05G 25/00* (2013.01); *G05G 2009/04718* (2013.01); *G05G 2009/04766* (2013.01)

(56) References Cited

U.S. PATENT DOCUMENTS

| | | | | |
|---|---|---|---|---|
| 2004/0027332 | A1* | 2/2004 | Cope | G05G 9/047 345/161 |
| 2009/0187292 | A1* | 7/2009 | Hreha | B64C 13/04 701/4 |
| 2009/0266940 | A1* | 10/2009 | Miller | B64C 13/10 244/223 |
| 2011/0303038 | A1* | 12/2011 | Peterson | B64C 13/04 74/471 XY |

FOREIGN PATENT DOCUMENTS

| | | |
|---|---|---|
| WO | 9721160 A2 | 6/1997 |
| WO | 0165329 A1 | 9/2001 |
| WO | 2007132267 A1 | 11/2007 |
| WO | 2014096773 A1 | 6/2014 |

OTHER PUBLICATIONS

International Search Report and Written Opinion received for Patent Application No. PCT/GB2013/053183, mailed on May 12, 2014. 10 pages.
GB Intellectual Property Office Search Report under Section 17(5) received for GB Patent Application No. 1222988.6, mailed on Apr. 22, 2013. 3 pages.
EP Intellectual Property Office Extended Search Report received for EP Patent Application No. 12275212.4 mailed on Jul. 31, 2013. 4 pages.

* cited by examiner

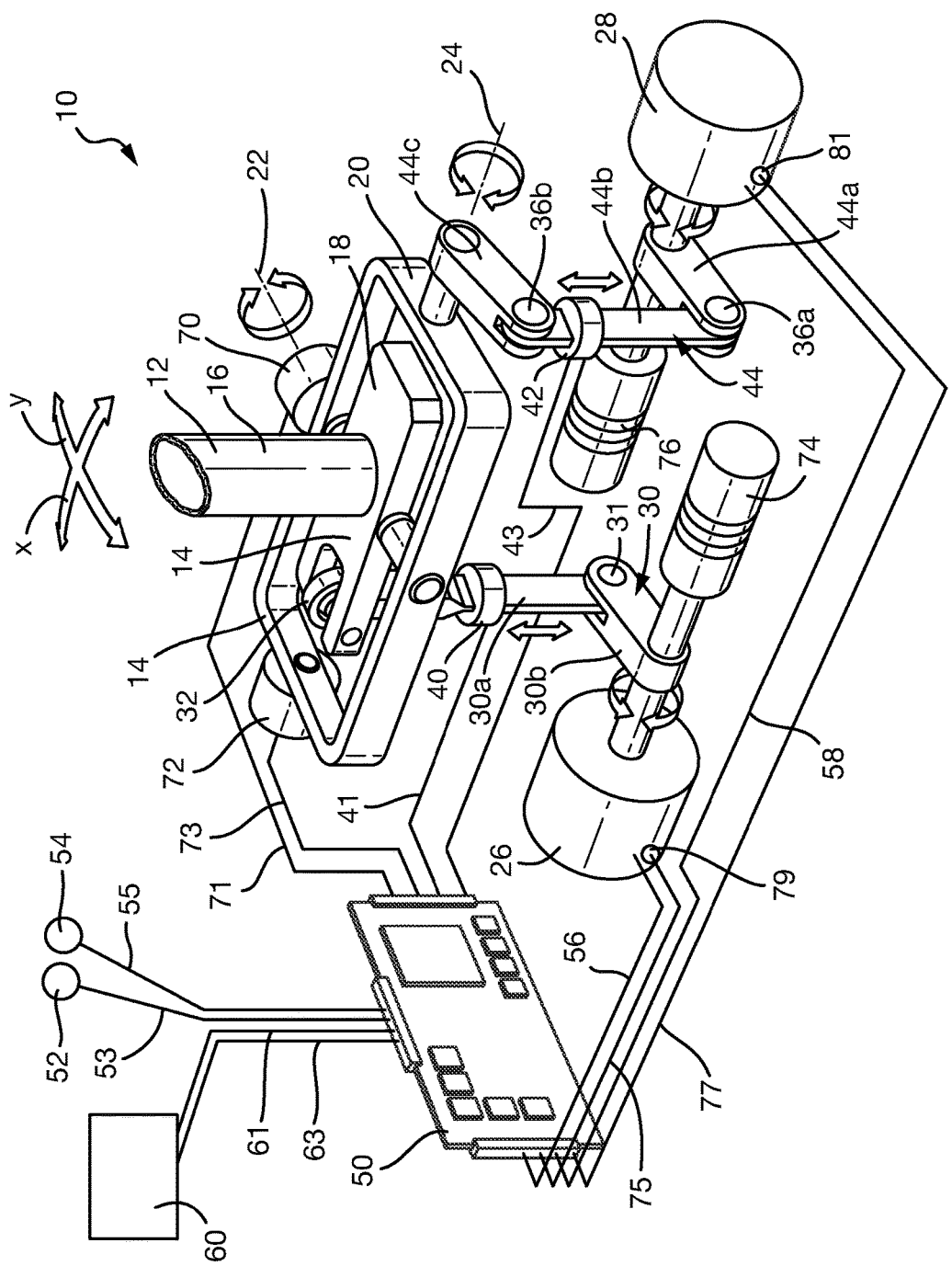

INCEPTOR APPARATUS

The present disclosure relates to an inceptor apparatus for operating a machine.

Controlling machines while they are operating can be complicated by forces generated by the operation of the machine itself. For example, a machine having a control lever may vibrate such that an operator has difficulty moving the lever to a desired position. If the machine is in motion, for example because it is a land, sea or air vehicle, the problem is further complicated by acceleration forces due to the maneuvers performed by the vehicle. One area of particular concern is how the apparatus for steering the vehicle might be affected by vehicle motion, for example vehicles using an inceptor (or "stick", such as that commonly used to steer an aircraft). If the vehicle is subjected to buffeting and changes in direction that result in acceleration forces that act on the inceptor, then the operator may find it increasingly difficult to control the vehicle.

Conventional means of countering acceleration forces is to mass balance the inceptor. Usually this is achieved by adding a mass of a dense metal (for example tungsten) at the opposite end of the stick from a grip portion handled by the user. This is known as "passive mass balancing". Since the stick is required to move when operated, the mass will also move, and requires free space to move in. Due to the limited depth available in the inceptor unit compared to the distance to the centre of gravity of the grip, and hence because of the limited lever ratio, the mass is usually heavier than the grip. As a result this conventional means is heavy and requires a large volume to be reserved inside the inceptor for the movement of the mass.

In other examples actuators may be used in addition to mass balancing which helps to reduce the amount of mass required. This is known as "active mass balancing". However such apparatus still requires significant volume for the mass to move around in, and provides a weight penalty for the device.

Hence an inceptor apparatus which can compensate for inertial forces, and which is smaller and lighter than conventional inceptors, is highly desirable.

SUMMARY

Accordingly there is provided an inceptor apparatus for operating a machine and having multiple modes of operation, the operation of the machine providing an output from at least one inertial sensor; the apparatus comprising: a stick member having a base portion, and a grip portion extending from the base portion in only one direction; at least one sensor for generating actual stick member position data; a control unit configured to receive an inertial force signal from the or each inertial sensor and the actual stick member position data; the control unit being operable in all modes of operation to generate a first stick member position compensation signal in dependence upon the inertial force signal and actual stick member position data.

A first actuator may be coupled to the base portion, the control unit being operable to output the first stick member position compensation signal to the first actuator, the first actuator being operable in response to the first stick member compensation signal to apply a force to the base portion in a first direction to substantially counter inertial force acting on the grip portion in a direction opposite to the first direction to thereby urge the stick member to a desired stick member position.

A second actuator may be coupled to the base portion; the control unit being operable to generate a second stick member position compensation signal in dependence upon the inertial force signal and actual stick member position data, the control unit also being operable to output the second stick member position compensation signal to the second actuator, the second actuator being operable in response to the second stick member compensation signal to apply a force to the base portion in a second direction to substantially counter inertial force acting on the grip portion in a direction opposite to the second direction to thereby urge the stick member to the desired stick member position.

At least one sensor may be a force sensor, and the actual stick member position data may comprise a grip signal generated by the force sensor, the grip signal being indicative of force exerted on the grip portion in the first and/or second direction. At least one of the actuators may coupled to the base portion via an arm, and the force sensor may be provided on the arm.

At least one sensor may a position sensor; and the actual stick member position data may comprise a position signal generated by the position sensor.

The control unit may be operable to output the stick member compensation signal(s) to the machine to thereby control the machine as desired by a user.

The base portion of the stick member may comprise a gimbal arrangement having: a first base member pivotably coupled to a second base member to permit the stick member and first base member to rotate about a first axis of rotation independently of the second base member, to allow the stick member to move in the first direction; and the second base member being pivotably mounted such that the stick member, first base member and second base member being rotatable about a second axis of rotation together to allow the stick member to move in the second direction; wherein the first actuator is coupled to the stick member via the first base member, and the second actuator is coupled to the stick member via the second base member.

There is also provided a method of operating an inceptor apparatus for operating a machine, the operation of the machine providing an output from at least one inertial sensor; the inceptor apparatus comprising: a stick member having a base portion and a grip portion extending from the base portion; a control unit; at least one sensor for generating actual stick member position data; wherein the method comprises: the control unit receiving an inertial force signal from the or each inertial sensor and the actual stick member position data; the control unit generating a first stick member position compensation signal in dependence upon the inertial force signal and actual stick member position data.

The inceptor apparatus may further comprise a first actuator coupled to the base portion; the method further comprising the steps of the control unit outputting the first stick member position compensation signal to the first actuator; the first actuator responding to the first stick member compensation signal to apply a force to the base portion in a first direction to substantially counter inertial force acting on the grip portion in a direction opposite to the first direction; to thereby urge the stick member to a desired stick member position.

The inceptor apparatus may further comprises a second actuator coupled to the base portion; the method further comprising: the control unit generating a second stick member position compensation signal in dependence upon the inertial force signal and actual stick member position data, the control unit outputting the second stick member position compensation signal to the second actuator, the second actuator responding to the second stick member compensation signal to apply a force to the base portion in a second direction to substantially counter inertial force acting on the grip portion in a direction opposite to the second direction, to thereby urge the stick member to the desired stick member position.

The at least one sensor may be a force sensor, the method further comprising: the force sensor generating a grip signal, wherein the actual stick member position data comprises the grip signal, for communication to the control unit, the grip signal being indicative of force exerted on the grip portion in the first and/or second direction.

At least one sensor may be a position sensor; the method further comprising: the position sensor generating an actual stick position signal, wherein the actual stick member position data comprises the actual stick position signal, for communication to the control unit.

BRIEF DESCRIPTION OF THE DRAWINGS

Examples of the present disclosure will now be described with reference to the accompanying FIG. 1, which shows an isometric view of an example of an inceptor apparatus according to the present disclosure.

DETAILED DESCRIPTION

The inceptor 10 shown in FIG. 1 is intended for operation of a machine, for example a static device, a land base vehicle, a water based vehicle or an air vehicle. The representation of the inceptor apparatus 10 is diagrammatic, with features such as a support casing and the machine being operated by the inceptor apparatus 10 not being shown so as to avoid obscuring details of the invention. In the particular example shown in FIG. 1 the inceptor assembly 10 is for piloting an aircraft. The inceptor 10 comprises a stick member 12 (for example a joystick-type hand controller). The stick member 12 is shown in a truncated form. That is to say the stick member 12 may extend further (i.e. be longer) than that shown in FIG. 1. The stick member 12 has a base portion 14 and a grip portion 16 which extends from the base portion 14. The grip portion 16, as its name suggests, is the part which will be handled by an operator, for example a pilot. Although shown as a plane tube in FIG. 1, the grip portion 16 may comprise an ergonomic grip to make handling easier, and buttons for the operation of the aircraft.

The base portion 14 of the stick member 12 comprises a gimbal arrangement having a first base member 18, from which the stick member 12 extends, and a second base member 20. The stick member 12 extends from the first base member 18 in only one direction. That is to say, the stick member 12 terminates on the top side of the base member 18, and does not extend beneath the base portion 14. The first base member 18 is pivotably coupled to the second base member 20 to permit the stick member 12 and first base member 14 to rotate about a first axis of rotation 22 independently of the second base member 20. The second base member 20 is pivotably mounted such that the stick member 12, first base member 18 and second base member 20 are rotatable about a second axis of rotation 24 together. The inceptor apparatus 10 further comprises at least one sensor for generating actual stick member position data. The sensor may be a position sensor or force sensor. The actual stick position data defines the orientation of the stick member 12, for example relative to a datum position.

A first actuator 26 is coupled to the stick member 12 via the first base member 18. A second actuator 28 is coupled to the stick member 12 via the second base member 20. In the example shown the first actuator 26 is coupled to the first base member 18 via a first arm 30. The arm 30 comprises a link 30a and link 30b which are joined at a pivotable joint 31 such that the arm 30 is articulated. The arm 30 is coupled to the first base member 18 by a bearing 32. The second actuator 28 is coupled to the second base member 20 by a second arm 44. The second arm 44 comprises a link 44a, link 44b and link 44c. Links 44a,44b are joined at a pivotable joint 36a, and links 44b,44c are joined at a pivotable joint 36b. Hence arm 44 comprises a double articulation. Link 44c is rigidly attached to the second base member 20. In the example shown actuators 26, 28 each comprise a motor held within a housing, and a shaft extending from the housing. The arms 30,44 are fixably connected to their respective shafts. Hence rotation of the shaft of the first actuator 26 will cause the stick 12 to rotate about the first rotational axis 22 in a first direction, indicated as "x" in FIG. 1. Likewise, rotation of the shaft of the second actuator 28, will cause rotation of the stick member 12 about the second rotational axis 24 in a second direction, shown as "y" in FIG. 1. In alternative examples the actuators may be provided as hydraulic devices, or any other appropriate type of actuator.

The first axis of rotation 22 is at right angles to the second axis of rotation 24. Likewise the first direction "x" and second direction "y" are at right angles to one another.

In the example shown in FIG. 1, a first force sensor 40 is provided on the first arm 30. A second force sensor 42 is provided on the second arm 44. In alternative arrangements the force sensor may be provided on the stick member 12.

The inceptor apparatus further comprises a control unit 50. The machine is provided with at least one inertial sensor 52, 54. The inertial sensors 52, 54 may be single axis sensors, multiple axis sensors, or a combination of single and multiple axis sensors. The control unit 50 is configured to receive inertial force signals from the at least one inertial sensor 52, 54, for example by communication lines shown as lines 53, 55 respectively. In the example shown, the inertial sensors 52, 54 are linked directly to the control unit 50. In an alternative example, the inertial sensors 52, 54 could be linked to the control unit 50 via the flight control computer 60. The control unit 50 is also configured to receive signals from the force sensors 40, 42, for example by communication lines 20 shown as lines 41, 43 respectively.

The control unit is provided with means to communicate with the first actuators 26 and second actuator 28, for example by communication lines shown as lines 56, 58 respectively. The control unit 50 is also configured to send signals to a flight control computer 60, for example by communication lines shown as lines 61, 63.

During operation of the vehicle, when the inceptor apparatus is in an "active" mode, inertial forces will be created and detected by the inertial sensors 52, 54. These signals will be sent to the control unit 50. The control unit 50 will generate a first stick member position compensation signal dependent upon the inertial force signals and actual stick member position data. The first stick member position compensation signal is then sent to the first actuator 26. The actuator 26 responds by operating to apply a force on the first base member 18 to substantially counter inertial force acting on the grip portion 16 and stick member 12 in a direction opposite to the first direction "x". Hence inertial forces which act on the stick member 12, and in particular the grip portion 16, are countered by the action of the first actuator 26 in response to the stick member compensation signal from the control unit 50. Likewise, for inertial forces acting on the stick member 12 in the second direction "y", the control unit 50 will operate to generate a second stick member position compensation signal dependent upon the inertial force signal and actual stick member position data, and in reaction to this the second actuator 28 will operate to apply a force to the second base member 20 in a second direction to substantially counter inertial force acting on the grip portion 16 in a direction opposite to the second direction "y". Hence, in "active" mode, and in the absence of any input from an operator to the stick member 12, the stick member 12 is held stationary relative to the vehicle by the action of the actuators in response to the stick member position compensation signals.

The control system 50 is configured to operate in the same way in "active" mode when an operator moves the stick 12. The force sensors 40, 42 are provided to generate a grip signal indicative of force exerted on the grip portion 16 in the first direction "x" and/or second direction "y". The control unit 50 is configured to receive the grip signal and is operable to generate first and/or second stick member position compensation signals determined as a function of the inertial force signal and actual stick member position data (comprising or derived from the grip signal). Hence when the stick member 12 is moved by an operator, the control unit 50 can determine the movement of the stick member 12 which is due to inertial forces and the movement of the stick member 12 which is due to action of the operator. That is to say, since the control unit 50 can determine the direction, magnitude and nature of the inertial forces which are likely to act on the stick member 12, including any necessary transformation from a plane of reference of the inertial sensors to a plane of reference of the inceptor, any force in addition to the known inertial forces is determined to be because of action of the operator. Hence in "active" mode, the actuators 26,28 act to subtract the inertial forces acting on the stick member 12 from the force applied by the pilot to the stick member 12.

Optionally, at least one of the first or second base members 18,20 may be provided with a position sensor 70,72 configured to generate a position signal indicative of angle of rotation about their respective rotational axis. The position sensors are operable to generate actual stick member position data. Hence the first base member 18 may be provided with a first position sensor 70, and the second base member 20 may be provided with a second position sensor 72. Signals from the position sensors 70, 72 are transmitted to and received by the control unit 50, for example by communication lines shown as lines 71, 73 respectively. The control unit 50 then determines a desired position of the stick member. The desired stick position is the orientation of the stick member 12, for example relative to a datum position, which the user wishes the stick member 12 to be. For example, the user may desire the stick member 12 to be in a particular location to obtain a desired result (for example, to go in a particular direction). However, acceleration forces on the stick member 12 may act to move the stick member to a different position (that is to say, the "actual" position). The control unit 50 is operable to determine if the actual position of the stick member 12, as indicated by the position sensors 70,77, corresponds to the desired position, where the desired position can be determined based on the amount of force applied to the stick member 12 and the inertial forces being recorded by the inertial sensors 52,54. If the actual position is not the same as the desired position then the control unit 50 generates a correction signal for communication to the actuators 26, 28 to move the stick member 12 to the desired position.

Alternatively, in addition to position sensors 70,72, position sensors 79,81 may be provided on the actuators 26,28 configured to generate a position signal indicative of angle of rotation about the actuators 26,28 respective rotational axes, and hence actual stick position data. Signals from the actuator position sensors 79,81 are transmitted to and received by the control unit 50, for example by communication lines shown as lines 75, 77 respectively. The control unit 50 then determines a desired position of the stick member. The control unit 50 is operable to determine if the actual position of the stick member 12, as indicated by the position sensors 79,81, corresponds to the desired position, where the desired position can be determined based on the amount of force applied to the stick member 12 and the inertial forces being recorded by the inertial sensors 52,54. If the actual position is not the same as the desired position then the control unit 50 generates a correction signal for communication to the actuators 26, 28 to move the stick member 12 to the desired position. In this example, the gimbal mounted position sensors 70,72 provide a signal which defines a datum reference position. This is particularly important in configurations where the motors of the actuators 26,28 rotate more than 360 degrees and thus need reference information to avoid cumulative positional errors.

The inceptor apparatus is also configured to operate in a "passive" mode in the event that the force sensors, actuators and/or their associated components are inoperable, for example due to a system failure. In such examples the control unit 50 is operable to receive actual stick member position data, and operable to determine a desired stick position value in dependence upon the inertial force signal and the stick member position data. That is to say, the control unit 50 "subtracts" the inertial forces to determine stick member position compensation signal, and hence the desired stick position. The stick member position compensation signal and/or desired stick member position data may then be communicated to the machine (for example the flight control computer 60) and the vehicle operated in accordance with the desired stick position rather than actual stick position.

Alternatively, the control unit 50 may receive the position signal and determines the total force applied to the stick member 12 to generate the position signal. It then may determine a desired stick position value in dependence upon the inertial force signal and the determined total force. Finally it generates a desired stick position value for communication to the flight control computer 60.

In an alternative example there is provided an inceptor apparatus as shown in FIG. 1, only without force sensors. This is known as a "force reflecting" configuration, in which the inceptor apparatus operates in a "force reflecting" mode. In such a configuration, the control unit 50 generates control signals in dependence upon the actual stick member position data (for example from position sensors) and determined desired stick position to thereby provide command(s) to the actuator(s) to move the stick member to the desired position. Hence, in such examples, acceleration forces on the stick member 12 may be countered by opposing forces generated by the actuators 26,28.

The inceptor may further comprise at least one spring return mechanism to bias the stick member 12 to datum position. For example, and as shown in FIG. 1, the shafts of the first and second actuators 26, 28 are each provided with springs 74, 76. Hence in the event of the actuators failing, the springs 74,76 will bias the stick member 12 via the gimbal arrangement, to a predetermined datum position.

The device 10 of the present disclosure has the advantage that, in "active" mode or a "force reflecting" configuration, inertial forces induced on the stick member 12 are cancelled out by the control unit 50 and associated control apparatus. This reduces the amount of effort the operator needs to exert to control the vehicle. The device 10 of the present disclosure has the advantage that in a "passive" mode, inertial forces induced on the stick member 12 are compensated for by the control unit 50, even if the position of the stick member is not adjusted by the actuators to counter inertial forces. Hence a device of the present disclosure results in an inherently safer machine since inertial forces will not affect the control of the machine. Additionally the inceptor apparatus can be fitted into a smaller housing unit than a conventional design, and hence the amount of space required to locate the inceptor apparatus in the vehicle is reduced. In the main this is because no extra mass is required on the stick member 12 below the pivot points of the first and second axes of rotation 22, 24, and hence the stick member 12 does not extend beneath the base member 18,20. Thus the volume beneath the base member 18,20 need only be big enough for that required for the actuator assemblies. Hence a device of the present disclosure is inherently lighter than that of the related art, which is highly desirable in vehicle design.

Although preferred embodiment(s) of the present invention have been shown and described, it will be appreciated by those skilled in the art that changes may be made without departing from the scope of the invention as defined in the claims.

The invention claimed is:

1. An inceptor apparatus for operating a machine and having multiple modes of operation, the operation of the machine providing an output from at least one inertial sensor, the apparatus comprising:
a stick member having a base portion, and a grip portion extending from the base portion in only one direction;
at least one sensor for generating actual stick member position data; and
a control unit configured to receive an inertial force signal from the at least one inertial sensor and the actual stick member position data, the control unit being operable in all modes of operation to generate a first stick member position compensation signal in dependence upon the inertial force signal and actual stick member position data, the modes of operation including an active mode to counter inertial force acting on the grip portion using one or more actuators, and a passive mode to compensate inertial force acting on the grip portion even if the stick member is not acted upon by the one or more actuators to counter inertial forces.

2. An inceptor apparatus as claimed in claim 1 wherein:
a first actuator of the one or more actuators is coupled to the base portion,
the control unit is operable to output the first stick member position compensation signal to the first actuator,
the first actuator being operable in response to the first stick member position compensation signal to apply a force to the base portion in a first direction in the active mode to counter the inertial force acting on the grip portion in a direction opposite to the first direction to thereby urge the stick member to a desired stick member position.

3. An inceptor apparatus as claimed in claim 2 wherein a second actuator of the one or more actuators is coupled to the base portion, wherein:
the control unit being operable to generate a second stick member position compensation signal in dependence upon the inertial force signal and actual stick member position data,
the control unit also being operable to output the second stick member position compensation signal to the second actuator,
the second actuator being operable in response to the second stick member position compensation signal to apply a force to the base portion in a second direction in the active mode to counter the inertial force acting on the grip portion in a direction opposite to the second direction to thereby urge the stick member to the desired stick member position.

4. An inceptor apparatus as claimed in claim 2, wherein:
the at least one sensor comprises a force sensor,
and the actual stick member position data comprises a grip signal generated by the force sensor, the grip signal being indicative of force exerted on the grip portion in the first direction.

5. An inceptor apparatus as claimed in claim 4 wherein the first actuator is coupled to the base portion via an arm, and the force sensor is provided on the arm.

6. An inceptor apparatus as claimed in claim 1, wherein:
the at least one sensor comprises a position sensor,
and the actual stick member position data comprises a position signal generated by the position sensor.

7. An inceptor apparatus as claimed in claim 3, wherein the control unit is operable to output the first and second stick member position compensation signals to the machine to thereby control the machine as desired by a user.

8. An inceptor apparatus as claimed in claim 3 wherein the base portion of the stick member comprises a gimbal arrangement having:
a first base member pivotably coupled to a second base member to permit the stick member and first base member to rotate about a first axis of rotation independently of the second base member, to allow the stick member to move in the first direction; and
the second base member being pivotably mounted such that the stick member, first base member and second base member are rotatable about a second axis of rotation together to allow the stick member to move in the second direction;
wherein the first actuator is coupled to the stick member via the first base member, and the second actuator is coupled to the stick member via the second base member.

9. A method of operating an inceptor apparatus for operating a machine, the operation of the machine providing an output from at least one inertial sensor, the inceptor apparatus including: a stick member having a base portion and a grip portion extending from the base portion; a control unit; and at least one sensor for generating actual stick member position data; wherein the method comprises:
receiving, by the control unit, an inertial force signal from the at least one inertial sensor and the actual stick member position data; and
generating, by the control unit, a first stick member position compensation signal in dependence upon the inertial force signal and actual stick member position data, wherein generating the first stick member position compensation signal can be carried out in both an active mode of operation and a passive mode of operation, the active mode to counter inertial force acting on the grip portion using one or more actuators, and the passive mode to compensate inertial force acting on the grip portion even if the stick member is not acted upon by the one or more actuators to counter inertial forces.

10. A method as claimed in claim 9 wherein the inceptor apparatus further comprises a first actuator coupled to the base portion, the method further comprising:
outputting, by the control unit, the first stick member position compensation signal to the first actuator; and
responding, by the first actuator, to the first stick member position compensation signal to apply a force to the base portion in a first direction to counter inertial force acting on the grip portion in a direction opposite to the first direction, to thereby urge the stick member to a desired stick member position.

11. A method as claimed in claim 10 wherein the inceptor apparatus further comprises a second actuator coupled to the base portion, the method further comprising:
generating, by the control unit, a second stick member position compensation signal in dependence upon the inertial force signal and actual stick member position data;
outputting, by the control unit, the second stick member position compensation signal to the second actuator; and
responding, by the second actuator, to the second stick member position compensation signal to apply a force to the base portion in a second direction to counter inertial force acting on the grip portion in a direction opposite to the second direction, to thereby urge the stick member to the desired stick member position.

12. A method as claimed in claim 10, wherein the at least one sensor comprises a force sensor, the method further comprising:
generating, by the force sensor, a grip signal, wherein the actual stick member position data comprises the grip signal, for communication to the control unit, the grip signal being indicative of force exerted on the grip portion in the first direction.

13. A method as claimed in claim 9, wherein the at least one sensor comprises a position sensor, the method further comprising:
generating, by the position sensor, an actual stick position signal, wherein the actual stick member position data comprises the actual stick position signal, for communication to the control unit.

14. An inceptor apparatus as claimed in claim 4, wherein:
the at least one sensor comprises a position sensor,
and the actual stick member position data comprises a position signal generated by the position sensor.

15. An inceptor apparatus as claimed in claim 14, wherein the control unit is operable to output the first stick member position compensation signal to the machine to thereby control the machine as desired by a user.

16. An inceptor apparatus as claimed in claim 7 wherein the base portion of the stick member comprises a gimbal arrangement having:
a first base member pivotably coupled to a second base member to permit the stick member and first base member to rotate about a first axis of rotation independently of the second base member, to allow the stick member to move in the first direction; and
the second base member being pivotably mounted such that the stick member, first base member and second base member are rotatable about a second axis of rotation together to allow the stick member to move in the second direction;
wherein the first actuator is coupled to the stick member via the first base member, and the second actuator is coupled to the stick member via the second base member.

17. A method as claimed in claim 11, wherein the at least one sensor comprises a force sensor, the method further comprising:
generating, by the force sensor, a grip signal, wherein the actual stick member position data comprises the grip signal, for communication to the control unit, the grip signal being indicative of force exerted on the grip portion in the first and/or second direction.

18. A method as claimed in claim 10, wherein the at least one sensor comprises a position sensor, the method further comprising:
generating, by the position sensor, an actual stick position signal, wherein the actual stick member position data comprises the actual stick position signal, for communication to the control unit.

19. A method as claimed in claim 12, wherein the at least one sensor comprises a position sensor, the method further comprising:
generating, by the position sensor, an actual stick position signal, wherein the actual stick member position data comprises the actual stick position signal, for communication to the control unit.

20. A method as claimed in claim 11, wherein the at least one sensor comprises a position sensor, the method further comprising:
generating, by the position sensor, an actual stick position signal, wherein the actual stick member position data comprises the actual stick position signal, for communication to the control unit.

21. An inceptor apparatus as claimed in claim 1 wherein in the passive mode, the control unit is configured to generate desired stick member position data using the generated first stick member position compensation signal such that the machine may be operated in accordance with the generated desired stick member position data.

* * * * *